Inventor
ALFRED W. FRANCIS,

Patented Aug. 25, 1931

1,820,657

UNITED STATES PATENT OFFICE

ALFRED W. FRANCIS, OF CAMBRIDGE, MASSACHUSETTS, ASSIGNOR TO MAGNOLIA PETROLEUM COMPANY, OF GALVESTON, TEXAS, A JOINT-STOCK ASSOCIATION

MANUFACTURE OF CARBON BLACK

Application filed May 4, 1927. Serial No. 188,794.

This invention relates to manufacture of carbon black; and in particular it relates to processes of and apparatus for manufacturing carbon black, wherein continuous partial combustion of carbonaceous material is effected under superatmospheric pressure and under operating conditions enabling deposition and recovery of a carbon black of desirable characteristics.

The invention has for one of its objects the manufacture of carbon black by the partial combustion of natural gas or other hydrocarbons or other carbonaceous material by operating in such a manner as to obtain a product of good quality and relatively high yields.

Another object of the invention is the production of carbon black in such a way that the heat of combustion of the fuel can be conserved and utilized in the production of power, instead of being wasted as has been the usual practice heretofore.

Other and further objects and the advantages of the invention will become apparent as the description proceeds.

According to one method heretofore known, a grade of carbon black satisfactory for printer's ink and for rubber compounding and many other uses has been obtained by deposition upon a metal plate from a luminous flame of natural gas burning in the open air, but the yield always has been low, seldom exceeding four per cent. Attempts have been made to increase the yield by partially smothering the flame by means of an inert gas such as carbon dioxide or nitrogen, or by limiting the supply of air so as to diminish the combustion of carbon, but these expedients have not accomplished their purpose. The reason for this will appear presently.

The manufacture of carbon black by thermal decomposition of hydrocarbon gases, which is another method already known, can be made to give thirty or forty per cent yields of carbon, but because of the high temperature required for a reasonable reaction rate, 1200° to 1300° C., the product is quite different, and entirely unfit for use in printer's ink, being inferior in tinctorial power. It is also less satisfactory for rubber compounding. Moreover, the high temperature and large input of heat required make the process costly, and since the conditions are very corrosive to equipment, the repair costs are high.

By the method of the present invention it is possible to obtain by continuous partial combustion of hydrocarbons or other carbonaceous material a much higher yield of carbon black than was obtainable by the combustion processes heretofore employed. Moreover, the quality of the black produced is fully as good as the product now regarded as standard in color, tinctorial power, for rubber compounding, and for the various other uses for which carbon black is employed.

It is known that mixtures richer than about 14 per cent methane in air are not inflammable at ordinary temperatures and pressures (atmospheric). Consequently, when methane is burned in air there is an inner cone of methane-rich mixture in which there is no combustion and from which no carbon could be deposited, the boundaries of which are determined by this limiting ratio. In such a critical or limiting mixture there exists about 18 per cent oxygen, or 1.3 mols. of oxygen to one of methane, which is in excess of that called for by the ideal reaction for the maximum production of carbon:

(1) 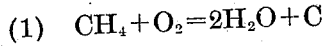  $CH_4 + O_2 = 2H_2O + C$

Moreover, theory and experiment agree that in the luminous part of a methane flame there is considerable unburned hydrogen and carbon monoxide which further accounts for low efficiency of carbon production, usually less than 3 per cent, when methane is burned with a luminous flame. The reaction corresponds more nearly with the equation (2) 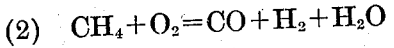  $CH_4 + O_2 = CO + H_2 + H_2O$ according to which there would be enough oxygen in a 14 per cent methane—86 per cent air mixture to completely gasify all of the carbon.

This is the reason for the low yield. The futility of using an inert gas is thus evident, since the flame will not extend inwards to a zone containing an oxygen-methane ratio of less than about 1.3 regardless of the presence of inert gases. In fact when a higher percentage of inert gas is present, the limiting ratio is much higher.

In order therefore to obtain the largest yield of carbon from the partial combustion of methane, conditions should be so regulated as to make the reaction taking place in the flame proceed more in accordance with equation (1) and less according to equation (2).

In accordance with the principles of the present invention, this result can be obtained by burning the methane with a luminous flame under conditions of superatmospheric pressure; that is, by compressing separately the methane and air and burning the former in a closed chamber. Moreover, the yield of carbon is approximately proportional to the working pressure. The higher the pressure, the larger is the yield of carbon. Pressures as high as 200 pounds per square inch, gage, have given good results and even higher yields are obtainable at still higher pressures, suitable apparatus being employed to withstand such pressures. Increase in operating pressure beyond about 300 pounds, or somewhat higher, results in very sudden and disproportionate increase in yield of carbon black. Pressures above 300 pounds gage are therefore especially advantageous from the standpoint of high yield.

While the invention is not necessarily dependent upon any particular theory for successful operation in practice, but rather rests upon actually observed facts, the following considerations are suggested as possibly affording an explanation of the effectiveness of the new process.

In the first place the results may be due in part to the fact that under pressure the upper inflammability limit of methane is increased. In other words the flame extends inwards to a richer mixture of methane in air, which condition is obviously favorable to carbon production.

The second part of the explanation involves fundamental principles of gaseous equilibrium and in particular LeChatelier's principle as applied to gaseous reactions, namely, that an increase of pressure will cause a reaction to take place in the direction which will decrease the number of gaseous molecules in unit volume.

Since we are desirous of suppressing Equation (2), we are in part concerned with the following reactions of carbon monoxide and hydrogen:

(3) 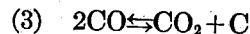$2CO \rightleftharpoons CO_2 + C$ (4) 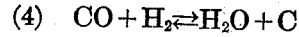$CO + H_2 \rightleftharpoons H_2O + C$ The equilibria represented by arrows in the above equations can be progressively shifted to the right by the application of increasing pressures in accordance with the principle above cited. The application of pressure will therefore be seen to favor the production of carbon, or conversely stated to minimize the conversion of methane to carbon monoxide and hydrogen as represented by Equation (2).

In order that the underlying principles of the invention may be still better understood, a typical way of practicing the new process to advantage will now be described in connection with the drawings which illustrates a desirable form of apparatus to employ.

Figure 1:
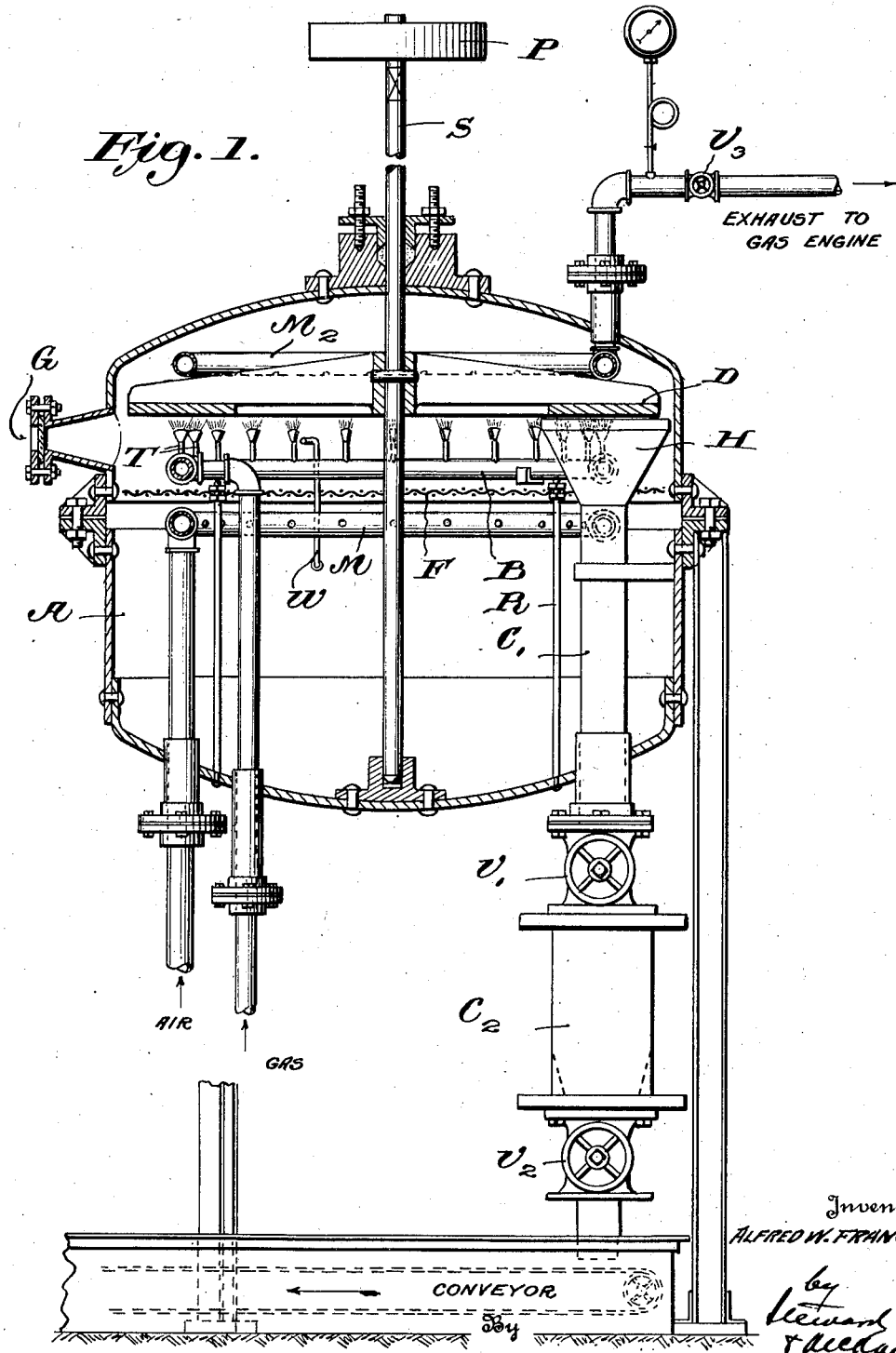
Fig. 1 is a central vertical section through the pressure chamber, parts being shown in elevation.
Figure 2:
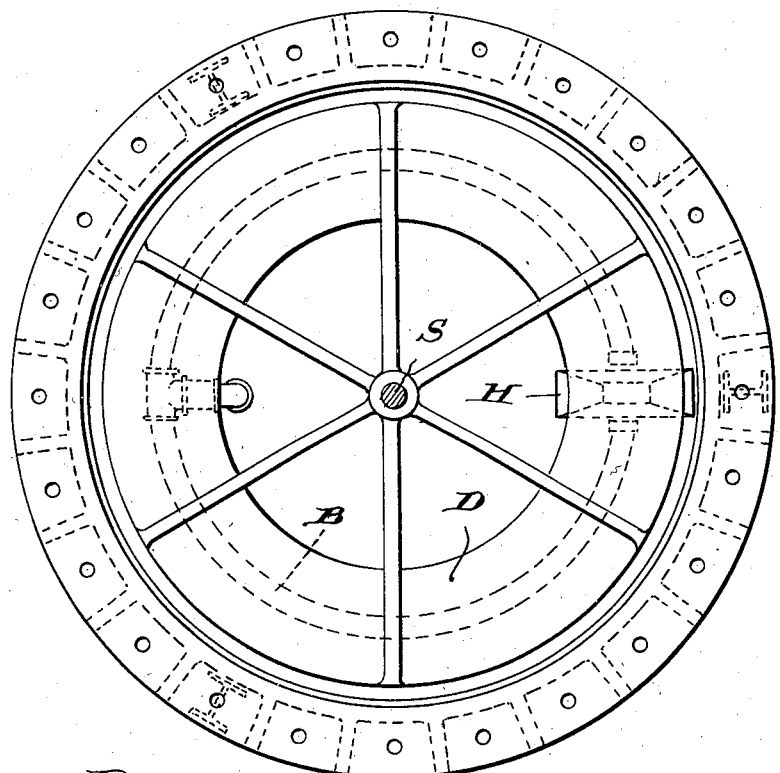
Fig. 2 is a top plan view with the cover of the chamber removed.
Figure 3:
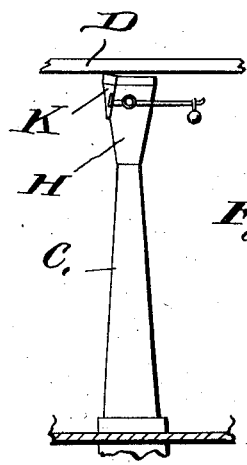
Fig. 3 is a side elevation of the scraper which is seen in front elevation in Fig. 1.

The illustrated apparatus consists of a closed vessel or autoclave A, provided with a rotating disk D, driven at a slow rate by the shaft S, and the pulley P. Compressed gas, such as natural gas, for example, is introduced through the burner B and tips T, and ignited by means of a hot wire or pilot W, or other suitable means, so that the continuously burning flames impinge upon the lower surface of the disk D, the ignited material being thereby cooled below the ignition point of the liberated carbon and carbon black being deposited upon the disk. The burner tips preferably should have long thin slots such as in a laboratory flame spreader. A sight glass G, is provided for the observation of the flames. Compressed air is introduced through the inlet manifold M, below a screen F, supported by rods R, which serves to break up currents of air and prevent direct drafts upon the flames. The black deposited upon the disk D, is scraped off as it revolves, by scraper K, and falls through a hopper H, into a compartment $C_1$, closed by a gate valve $V_1$. At intervals $V_1$ is opened, allowing the black to fall into lock chamber $C_2$. After $V_1$ is closed, another gate valve $V_2$ is opened, permitting the removal of the black without releasing the pressure in the autoclave furnace A.

The other products of combustion, water vapor and some carbon dioxide, together with nitrogen and some excess oxygen, are removed through a manifold $M_2$ in the top of the furnace, which is thus baffled by the depositing plate to avoid excessive drafts. The valve $V_3$, is regulated in such a way as to maintain the pressure in the furnace and yet allow the gases to escape at a rate sufficient to prevent even partial smothering of the flames. The pressure and sensible heat of the escaping gases can be used to operate a gas engine, for the generation of power, some of which will be required to compress fresh air for the operation. Alternatively, the heat can be conserved by a waste heat boiler, or by heat interchange used to preheat the fresh air for the operation.

A suitable air pressure for the carrying out of the invention is 150 pounds per square inch gage. The pressure of the combustible gas should be at substantially the same or a slightly higher pressure than that of the air, that is just sufficient to cause a gentle flow of gas through the burner tips. The difference in pressure between the air and gas is controlled by any suitable external device, not shown, since it does not constitute a part of my invention.

In a typical instance, application of the new process to a dry natural gas from Texas, analyzing 88 per cent methane, 6 per cent ethane, and 6 per cent nitrogen, gave a yield of dry carbon black amounting to 8.12 per cent, or 2.7 pounds per thousand cubic feet of gas burned. The gas was burned at a mean pressure of 107.5 pounds gage. Such a gas would give by the ordinary partial combustion at atmospheric pressure not more than 0.8 pounds per thousand cubic feet.

The practice of the invention is not limited to the type of apparatus described, which is by way of illustration only. Any other apparatus suitable for the carrying out of my process may be used without departing from the spirit and scope of my invention. For example, several units may be mounted vertically above each other within the same shell, the depositing plates or disks being driven by the same shaft and pulley, and the black being discharged by a single chute into a common compartment. Or a screw conveyor may deliver the black from several autoclaves or batteries of units located beside each other into a common lock arrangement for removing the black.

Other fuels from which greatly increased yields have been obtained as compared to those obtained by burning them at atmospheric pressure under otherwise similar conditions are ethylene, "weathering gas", which consists essentially of propane and butane, gasoline, and paraffin wax. All of these fuels where employed in the present process can be made to give higher yields than those obtainable from methane. In each case the carbon black produced is satisfactory and at least equal in quality to high grade carbon black now on the market.

Other fuels which can be employed advantageously by my invention are hydrocarbon gases such as acetylene and propylene; liquid hydrocarbons such as gas oil, fuel oil, benzol; and even oxygenated liquids and solids containing carbon such as animal and vegetable oils and fats. In the use of liquids the burners require a slight modification, being provided with wicks or capillary outlets, and the fuel being injected from a blow case connected directly to the autoclave or the air line so as to insure the proper pressure. Solids normally require liquefaction before injection.

It is to be understood that, the process of the invention is not restricted to employment of superatmospheric pressures of the order of magnitude specifically mentioned hereinabove in describing a desirable way of carrying out the process. For practical purposes, however, the pressure used should be substantial and should ordinarily be not less than ten pounds gage. Most desirably it should amount to several atmospheres, at least.

What is claimed is:

1. The process of partial conversion of a carbonaceous material into elementary carbon, which comprises maintaining continuous partial combustion of said carbonaceous material under super-atmospheric pressure in excess of ten pounds.

2. The process of making carbon black which comprises maintaining continuous partial combustion of carbonaceous material under superatmospheric pressure in excess of ten pounds, and collecting the resultant carbon black.

3. The process of making carbon black which comprises continuously burning hydrocarbon material with a luminous flame under superatmospheric pressure in excess of ten pounds in a closed chamber, and effecting deposition of carbon black from said flame.

4. The process of making carbon black which comprises maintaining continuous partial combustion of substantially wholly saturated hydrocarbon material in an appropriate combustion-supporting medium and under superatmospheric pressure in excess of ten pounds to increase the upper inflammability limit.

5. The process of making carbon black which comprises maintaining continuous partial combustion of hydrocarbon material in an enclosed space under superatmospheric pressure in excess of ten pounds, collecting resultant carbon black, and utilizing the energy of the exhaust gases in the performance of useful work.

6. The process of making carbon black which comprises maintaining continuous partial combustion of hydrocarbon material in an enclosed space under superatmospheric pressure in excess of ten pounds, collecting resultant carbon black, and utilizing the heat and pressure of the exhaust gases to operate a gas engine.

7. The process of making carbon black which comprises maintaining continuous luminous-flame combustion of gaseous hydrocarbon material in an enclosed space under superatmospheric pressure in excess of ten pounds, and collecting carbon black from the flame.

8. The process of making carbon black which comprises maintaining continuous luminous-flame combustion of natural gas in an enclosed space under superatmospheric pressure in excess of ten pounds, and collecting carbon black from the flame.

9. The process of making carbon black which comprises maintaining continuous luminous-flame combustion of gas consisting chiefly of methane in an enclosed space under superatmospheric pressure in excess of ten pounds, and collecting carbon black from the flame.

10. The process of making carbon black which comprises maintaining continuous luminous-flame combustion of gaseous substantially wholly saturated hydrocarbon material in an enclosed space under superatmospheric pressure in excess of ten pounds, and collecting carbon black from the flame.

11. The process of making carbon black which comprises maintaining continuous luminous-flame combustion of gaseous hydrocarbon material in an enclosed space under superatmospheric pressure amounting to several atmospheres, and collecting carbon black from the flame.

12. The process of making carbon black which comprises maintaining continuous luminous-flame combustion of gaseous hydrocarbon material in an enclosed space under superatmospheric pressure amounting to at least 300 pounds, and collecting carbon black from the flame.

13. The process of making carbon black which comprises maintaining continuous partial combustion of carbonaceous material with a luminous flame in an enclosed space under superatmospheric pressure, the flame impinging upon a suitable depositing surface, and collecting deposited carbon black.

14. The process set forth in claim 9, further characterized by the fact that the flame is shielded against excessive drafts.

15. In the process of making carbon black by partial combustion of carbonaceous matter under superatmospheric pressure in excess of ten pounds in an enclosed space, the step of removing the carbon black from said space substantially without releasing the pressure therein.

16. The process of partial conversion of carbonaceous material into elementary carbon, which comprises introducing said material into air previously compressed to at least several atmospheres, igniting said material and checking the resultant combustion by cooling the ignited material below the ignition point of the liberated carbon, and collecting the resultant carbon black.

17. The process of making carbon black which comprises continuously burning carbonaceous material with a luminous flame surrounded by air maintained at a pressure of at least several atmospheres, the flame impinging upon a suitable depositing surface, and collecting deposited carbon black.

In testimony whereof I hereunto affix my signature.

ALFRED W. FRANCIS.